US012165796B2

(12) United States Patent
Deng et al.

(10) Patent No.: US 12,165,796 B2
(45) Date of Patent: Dec. 10, 2024

(54) POWER ELECTRONIC TRANSFORMER STRUCTURE

(71) Applicant: GLOBAL ENERGY INTERCONNECTION RESEARCH INSTITUTE CO., LTD., Beijing (CN)

(72) Inventors: Zhanfeng Deng, Beijing (CN); Jun Ge, Beijing (CN); Guoliang Zhao, Beijing (CN); Zhenjiang Shi, Beijing (CN); Feng Wang, Beijing (CN); Qiuyu Shi, Beijing (CN); Wei Kang, Beijing (CN); Guangyao Qiao, Beijing (CN)

(73) Assignee: GLOBAL ENERGY INTERCONNECTION RESEARCH INSTITUTE CO., LTD., Beijing (CN)

( * ) Notice: Subject to any disclaimer, the term of this patent is extended or adjusted under 35 U.S.C. 154(b) by 989 days.

(21) Appl. No.: 17/310,326

(22) PCT Filed: Feb. 1, 2019

(86) PCT No.: PCT/CN2019/074474
§ 371 (c)(1),
(2) Date: Jul. 27, 2021

(87) PCT Pub. No.: WO2019/157993
PCT Pub. Date: Aug. 22, 2019

(65) Prior Publication Data

US 2022/0093313 A1 Mar. 24, 2022

(30) Foreign Application Priority Data

Feb. 13, 2018 (CN) ......................... 201810149716.6

(51) Int. Cl.
*H01F 27/16* (2006.01)
*H01F 30/12* (2006.01)

(52) U.S. Cl.
CPC ............. *H01F 27/16* (2013.01); *H01F 30/12* (2013.01)

(58) Field of Classification Search
CPC .......... H01F 27/16; H01F 27/06; H01F 27/00; H01F 27/22; H01F 27/28; H01F 27/40;
(Continued)

(56) References Cited

U.S. PATENT DOCUMENTS 5,331,536 A * 7/1994 Lane ....................... H01F 27/40
336/183
5,537,074 A * 7/1996 Iversen ..................... G05F 1/70
257/713
(Continued)

FOREIGN PATENT DOCUMENTS

CN 202534468 U 11/2012
CN 105304267 A 2/2016
(Continued)

OTHER PUBLICATIONS

International Search Report in the international application No. PCT/CN2019/074474, mailed on Apr. 22, 2019.
(Continued)

*Primary Examiner* — Adam B Dravininkas
(74) *Attorney, Agent, or Firm* — Syncoda LLC; Feng Ma

(57) ABSTRACT

A power electronic transformer structure includes: a support, a high-frequency transformer, a base, high-voltage side modules, and a low-voltage side module. The high-voltage side modules are respectively located at the front, top, and back of the support; the low-voltage side module is located at the bottom of the support; the high-frequency transformer is located at the middle of the support.

18 Claims, 7 Drawing Sheets

(58) Field of Classification Search
CPC .. H01F 30/12; H05K 7/20927; H05K 7/1432; H05K 7/14322; H05K 7/14329
See application file for complete search history.

(56) References Cited

U.S. PATENT DOCUMENTS

| | | | | |
|---|---|---|---|---|
| 2005/0270806 | A1* | 12/2005 | Zhu | H02M 3/33576 363/17 |
| 2012/0257431 | A1* | 10/2012 | Suzuki | H02M 7/003 363/132 |
| 2015/0318772 | A1* | 11/2015 | Jahshan | B60L 50/40 318/400.41 |
| 2016/0219757 | A1* | 7/2016 | Pietrantonio | H05K 7/20927 |
| 2021/0344283 | A1* | 11/2021 | Zhou | H02M 3/1582 |

FOREIGN PATENT DOCUMENTS

| | | | |
|---|---|---|---|
| CN | 105428045 | A | 3/2016 |
| CN | 107659196 | A | 2/2018 |
| CN | 208225644 | U | 12/2018 |

OTHER PUBLICATIONS

Written Opinion of the International Search Authority in the international application No. PCT/CN2019/074474, mailed on Apr. 22, 2019.

* cited by examiner

POWER ELECTRONIC TRANSFORMER STRUCTURE

CROSS-REFERENCE TO RELATED APPLICATIONS

This application is a U.S. national stage of International Application No. PCT/CN2019/074474 filed on Feb. 1, 2019, which claims priority to Chinese Patent Application No. 201810149716.6 filed on Feb. 13, 2018. The disclosures of these applications are hereby incorporated by reference in their entirety.

TECHNICAL FIELD

The present disclosure relates to a transformer structure, and in particular to a power electronic transformer structure.

BACKGROUND

With the continuous development of a modern power grid, more and more distributed power generation systems and distributed energy storage systems need to be connected to the power grid. When a new energy power generation system is connected to the grid, interface equipment needs to provide multi-stage voltage adjustment, alternating current-direct current intercommunication conversion, intelligent energy management, and other functions. A traditional transformer has limited functions and cannot provide the above-described functions.

SUMMARY

An embodiment of the present disclosure provides a power electronic transformer structure.

The power electronic transformer structure includes: a support, a high-frequency transformer, a base, high-voltage side modules, and a low-voltage side module.

The high-voltage side modules are respectively disposed at front, top, and back portions of the support.

The low-voltage side module is disposed at a bottom portion of the support.

The high-frequency transformer is disposed at a middle portion of the support.

1—high-frequency transformer; 2, 3, or 4—high-voltage side module; 5—low-voltage side module; 6—cooling circuit of low-voltage side module; 6'—cooling circuit of high-voltage side module; 7—copper bus; 8—support; 9—base; 10—water-cooled plate; 11—electrode; 11—1—inlet; 11—2—outlet; 12—cooling circuit of high-frequency transformer; 13—deionized water system; 14—coarse filter; 15—deionized exchange resin tank; 15-1—tank body; 15-2—support frame; 15-3—deionized exchange resin; 15-4—net cage; 15-5—net cover; 15-6—water outlet pipe; 15-7—upper cover; 15-8—water inlet pipe; 15-9—sealing ring; 16—fine filter; 20, 30—shielding shell; 21, 31—driving board card; 22, 32—power semiconductor device; 40—optical fiber; 50—fixing member; 60—fastener; 70—equipotential wire; 80—iron core or coil of high-frequency transformer; 90—high-voltage side rectifier module; 91—low-voltage side rectifier module; 100—power electronic transformer; 101—direct current power grid; 102—alternating current power grid.

DETAILED DESCRIPTION

In order to better understand the present disclosure, the technical solution of the present disclosure is further detailed below in conjunction with the accompanying drawings.

Figure 1:
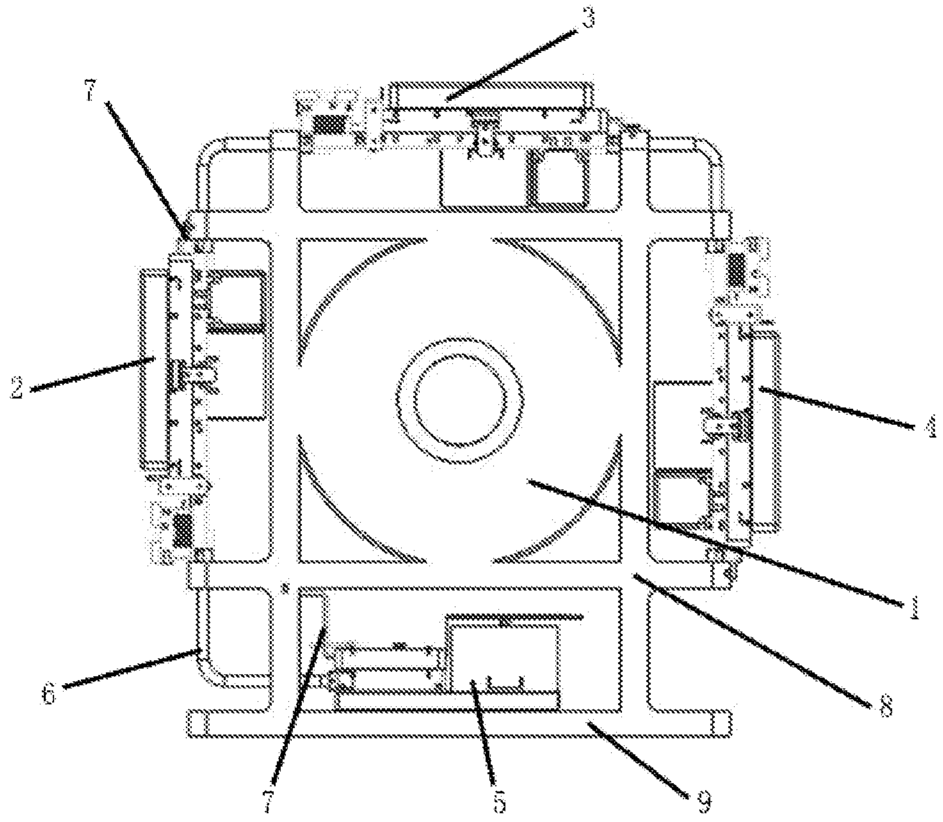
FIG. 1 is a schematic diagram of a transformer structure provided by an embodiment of the present disclosure.
Figure 2:
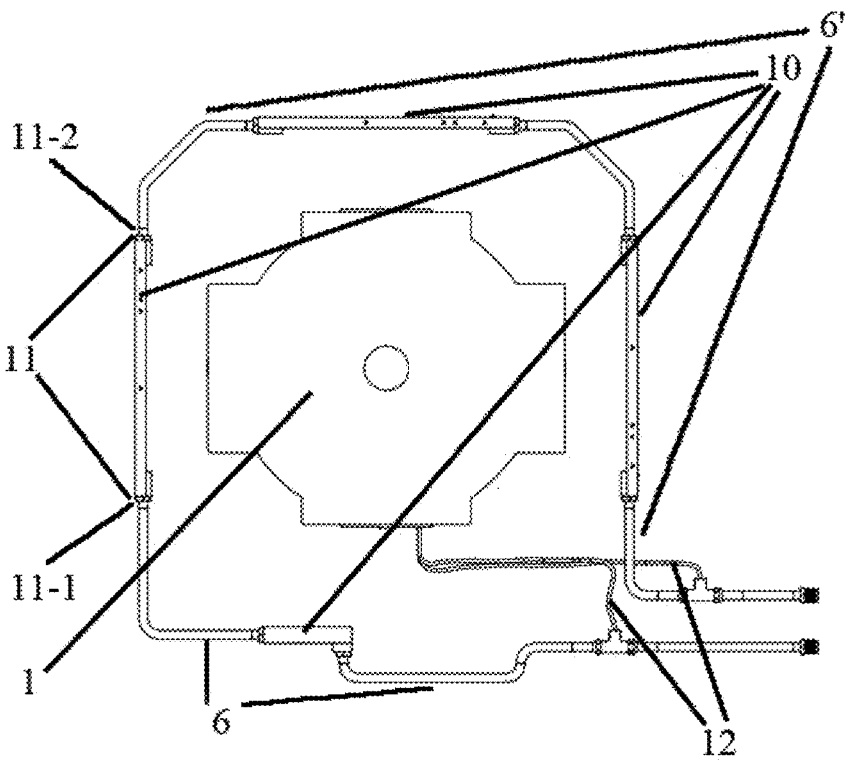
FIG. 2 is a schematic diagram of liquid flow through a transformer structure provided by an embodiment of the present disclosure.

As illustrated in FIGS. 1 to 2, a transformer structure provided by the present disclosure includes: a support 8, a high-frequency transformer 1, a base 9, and cooling circuits of high-voltage side modules and a low-voltage side module 5. The high-voltage side modules are respectively disposed at the front, top, and back portions of the support 8. The low-voltage side module 5 is disposed at the bottom portion of the support 8. The high-frequency transformer 1 is disposed in the middle of the support 8. The support 8 and the base 9 are made of an epoxy material. The support 8 and the base 9 are formed by machining epoxy laminated boards. The transformer structure is of a ring-shaped design. By reasonably designing the load support and insulation grids of the transformer structure, inter-phase of the high-voltage side modules is ensured, and sufficient electrical insulation strength is provided between different phases of the high-voltage side modules and between the high-voltage side modules and the low-voltage side module. The inter-phase inside the high-frequency transformer 1 and high/low-voltage insulation are ensured by an epoxy casting material and process. An epoxy support material adopts an epoxy material with good mechanical and electrical properties, and can meet the dynamic and static load requirements of the power electronic transformer.

The front portion and the back portion are oppositely arranged, and the top portion and the bottom portion are oppositely arranged. The middle portion is disposed between the front portion and the back portion and also between the top portion and the bottom portion. The bottom portion is typically configured to be in contact with or connected to a support surface of the transformer structure, e.g., connected to the ground on which the transformer structure is placed. The bottom portion is a local part close to the base 9 in the present example.

The high-voltage side module(s) may include: various power modules on a high-voltage side, e.g., a rectifier module on a high-voltage side and/or a transformer module on a high-voltage side. In the embodiment, the rectifier module on the high-voltage side may be simply referred to as a high-voltage side rectifier module, and the transformer module on the high-voltage side may be referred to simply as a high-voltage side transformer module.

The low-voltage side module may include: various power modules on a low-voltage side, e.g., a rectifier module on a low-voltage side and/or a transformer module on a low-voltage side. In the embodiment, the rectifier module on the low-voltage side may be simply referred to as a low-voltage side rectifier module, and the transformer module on the low-voltage side may be referred to simply as a low-voltage side transformer module.

In some embodiments, the high-voltage side modules and the low-voltage side module may further include: current modules with other functions, such as harmonic filtering modules and the like.

In the embodiment, the high-voltage side modules and the low-voltage side module are relative, and voltage values processed by the high-voltage side modules are higher than a voltage value processed by the low-voltage side module.

The high-voltage side modules 2, 3, and 4 and the low-voltage side module 5 are mutually independent, are respectively connected to three-phase high-voltage primary side terminals and a low-voltage secondary side wiring terminal of the high-frequency transformer 1, and are connected by lapped copper buses 7. The copper buses 7 may be copper-clad aluminum buses. The lapped copper buses 7 adopt the copper-clad aluminum buses for connection due to an obvious skin effect of the lapped copper buses 7 caused by a high-frequency current at the position. For example, the high-voltage side modules are connected to the high-frequency transformer through lapped copper buses. The copper buses may be copper-clad aluminum buses.

The high-frequency transformer 1, the high-voltage side modules, and the low-voltage side module are respectively provided with a cooling circuit. The cooling circuit 12 of the high-frequency transformer is connected to the cooling circuits 6' of the high-voltage side modules and the cooling circuit 6 of the low-voltage side module in parallel. The cooling circuit 12 of the high-frequency transformer is connected to the cooling circuits 6' of the high-voltage side modules and the cooling circuit 6 of the low-voltage side module in parallel, so that an intensive mode of large series connection and small parallel connection is realized. The cooling circuits are cooling water circuits. The cooling circuits 6' of the high-voltage side modules are arranged in series with the low-voltage side module. The high-voltage side modules and the low-voltage side module are connected in series, so that the number of connection points is effectively reduced, the liquid seepage and leakage probability is reduced, a liquid circuit is simplified into a whole, and device maintenance is facilitated. In order to guarantee that a full-control device in a high-voltage side three-phase rectification inversion module works in the same state, a water-cooled plate for cooling in the module should reach a minimum flow resistance under the condition of meeting a junction temperature of the full-control device. Meanwhile, it is ensured that a difference between a liquid inlet temperature of a head module and a liquid inlet temperature of a tail module in a series water circuit does not exceed 5° C. The support 8 is #-shaped. The high-frequency transformer 1 is arranged on an inner side of the #-shaped support, and an outer side of the high-frequency transformer is tangent to inner sides of four components forming the #-shaped support.

Figure 5:
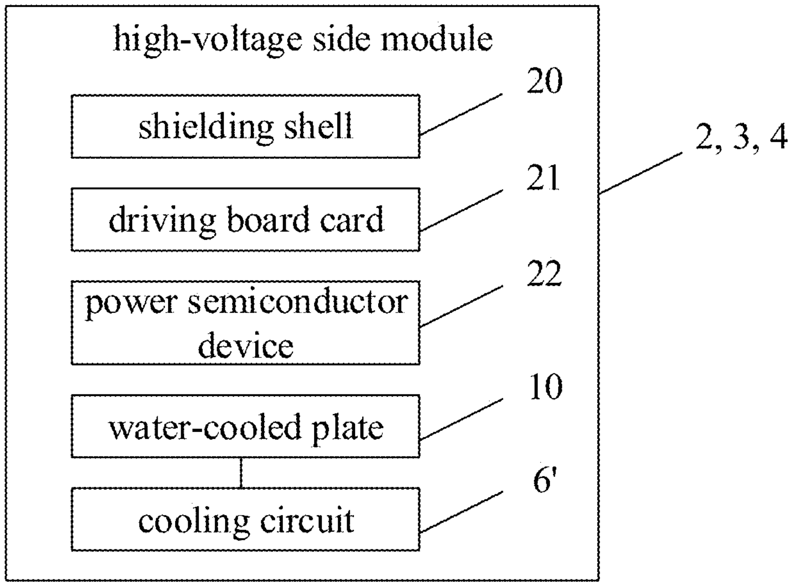
FIG. 5 is a schematic composition block diagram of a high-voltage side module provided by an embodiment of the present disclosure.
Figure 6:
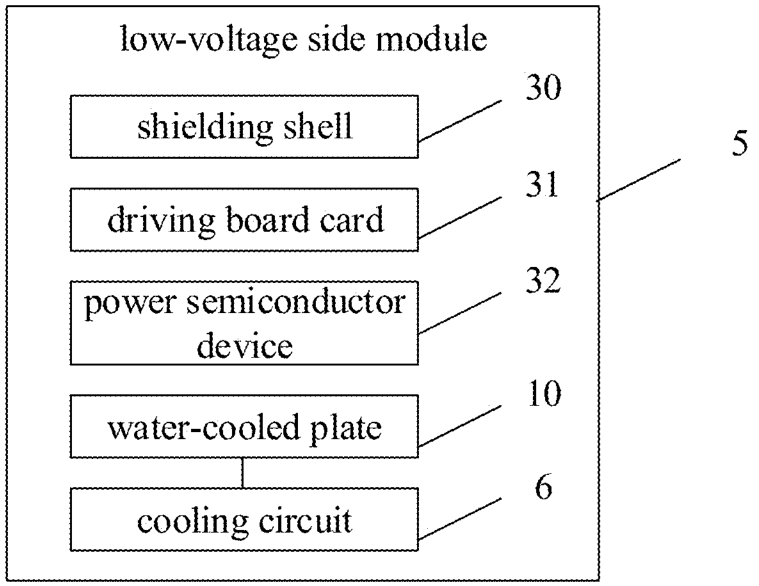
FIG. 6 is a schematic composition block diagram of a low-voltage side module provided by an embodiment of the present disclosure.

As shown in FIGS. 2 and 5-6, the high-voltage side modules respectively include: a shielding shell 20, a driving board card 21, a power element 22, and a water-cooled plate 10. The low-voltage side module includes: a shielding shell 30, a driving board card 31, a power element 32, and a water-cooled plate 10. Electrodes 11 are arranged at an inlet 11-1 and an outlet 11-2 of the water-cooled plate 10. The electrodes 11 are made of the following components in percentage by mass: 0.02% of P, 0.11% of Mn, 0.282% of Si, 25% of Cr, 18% of Ni, 0.293% of Mo, 0.121% of Cu, and 0.0015% of Ti. The adopted water-cooled plate 10 has the advantages that under a rated flow, the integral flow resistance is basically the same as the flow resistance of the high-frequency transformer and is not suitable to be too large, so that the phenomena of water seepage and water leakage caused by too high operating pressure of a cooling system during the integral operation of the power electronic transformer are avoided. The electrodes 11 are adopted to ensure that corrosion of an aluminum heat dissipation plate due to a cooling hydro-chemical reaction is minimized during operation of the device.

Figure 7:
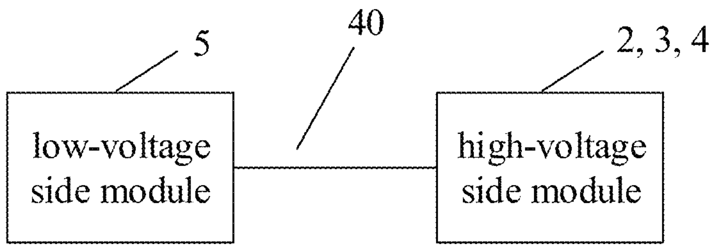
FIG. 7 is a partial schematic block diagram of a transformer structure provided by an embodiment of the present disclosure.

As shown in FIG. 7, the low-voltage side module 5 drives and controls the high-voltage side modules through optical fibers 40.

Figure 8:
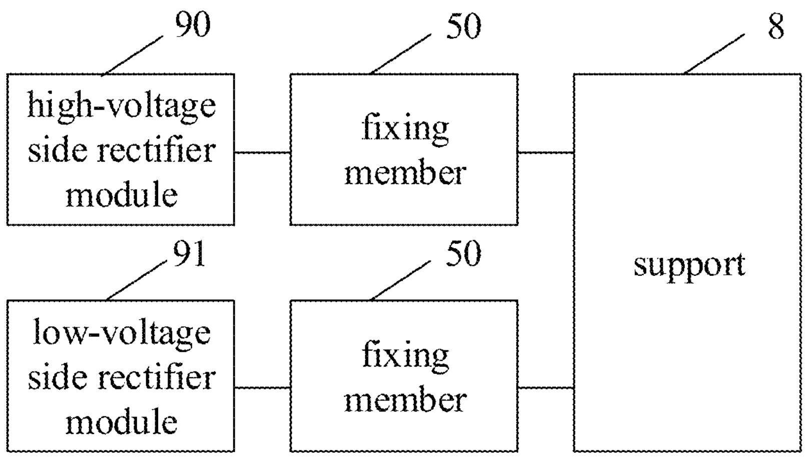
FIG. 8 is a partial schematic block diagram of a transformer structure provided by an embodiment of the present disclosure.
Figure 9:
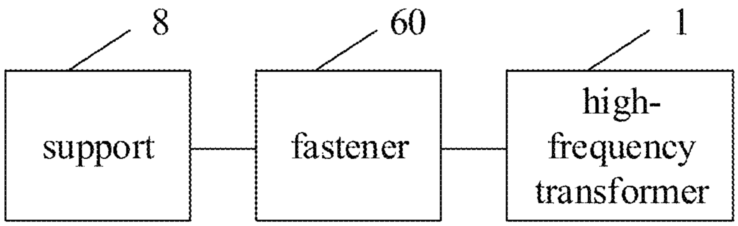
FIG. 9 is a partial schematic block diagram of a transformer structure provided by an embodiment of the present disclosure.
Figure 10:
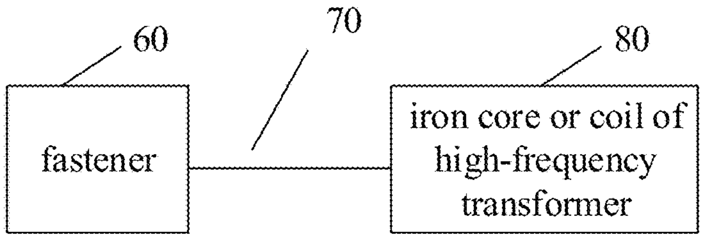
FIG. 10 is a partial schematic block diagram of a transformer structure provided by an embodiment of the present disclosure.

As shown in FIGS. 8-10, the high-voltage side rectifier modules 90 and the low-voltage side rectifier module 91 are fixedly connected to the support 8 through fixing members 50, respectively. The support 8 is tightly connected to the high-frequency transformer 1 through fasteners 60 which are connected to an iron core or a coil 80 of the high-frequency transformer 1 through equipotential wires 70. Therefore, no suspension potential exists in the entire device. The fixing members 50 and the fasteners 60 may be bolts.

Figure 11:
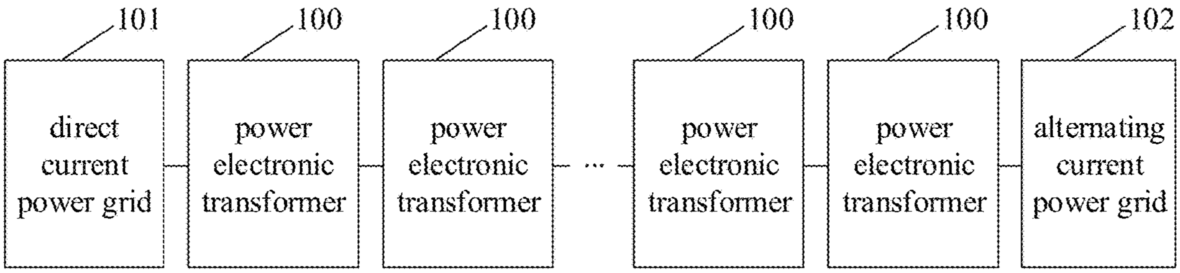
FIG. 11 is a schematic block diagram of a transformer structure provided by an embodiment of the present disclosure.

In some embodiments, as shown in FIG. 11, the power electronic transformer structure includes: connecting N power electronic transformers 100 in series for use; and connecting head ends of the power electronic transformers 100 to an alternating current power grid 102 and tail ends of the power electronic transformers 100 to a direct current power grid 101 after the power electronic transformers 100 are connected in series between high-voltage side in-phase modules.

The high-voltage side modules are configured to rectify and invert a network side current into a high-frequency current through internal full-control devices and inject the high-frequency current into the high-frequency transformer. The high-frequency current is converted into a low-voltage direct current through the low-voltage side rectifier module after passing through the high-frequency transformer. The low-voltage direct current is used for supplying power to a direct current load.

The transformer structure is a valve structure formed by connecting head ends of the N power electronic transformers 100 to an alternating current power grid 102 and tail ends of the power electronic transformers 100 to a direct current power grid 101 after connecting the power electronic transformers 100 in series on a high-voltage side. The high-voltage side modules rectify and invert a network side current into a high-frequency current through internal full-control devices and inject the high-frequency current into the high-frequency transformer. The high-frequency current is converted into a low-voltage direct current through the low-voltage side rectifier module after passing through the high-frequency transformer. The low-voltage direct current is used for supplying power to a direct current load.

The valve structure may be a structure composed of one or more switches. In the valve structure, the N power electronic transformers 100 may be inter-alternating current high voltage input high-voltage side devices, and may be connected to the direct current power grid after being connected in series.

For example, after the N power electronic transformers 100 are connected in series, the primary of the first power electronic transformer is connected to the alternating current power grid 102, and the secondary of the last power electronic transformer is connected to the direct current power grid 101.

In the embodiment, a high frequency is relative to a low frequency, and a frequency for a high-frequency alternating current is higher than a frequency for a low-frequency alternating current. For example, the high-frequency alternating current may be an alternating current of 3 kHz or more, and the low-frequency alternating current may be an alternating current of 3 kHz or less.

The network side current may be a current connected to the power electronic transformers from the power grid.

Figure 3:
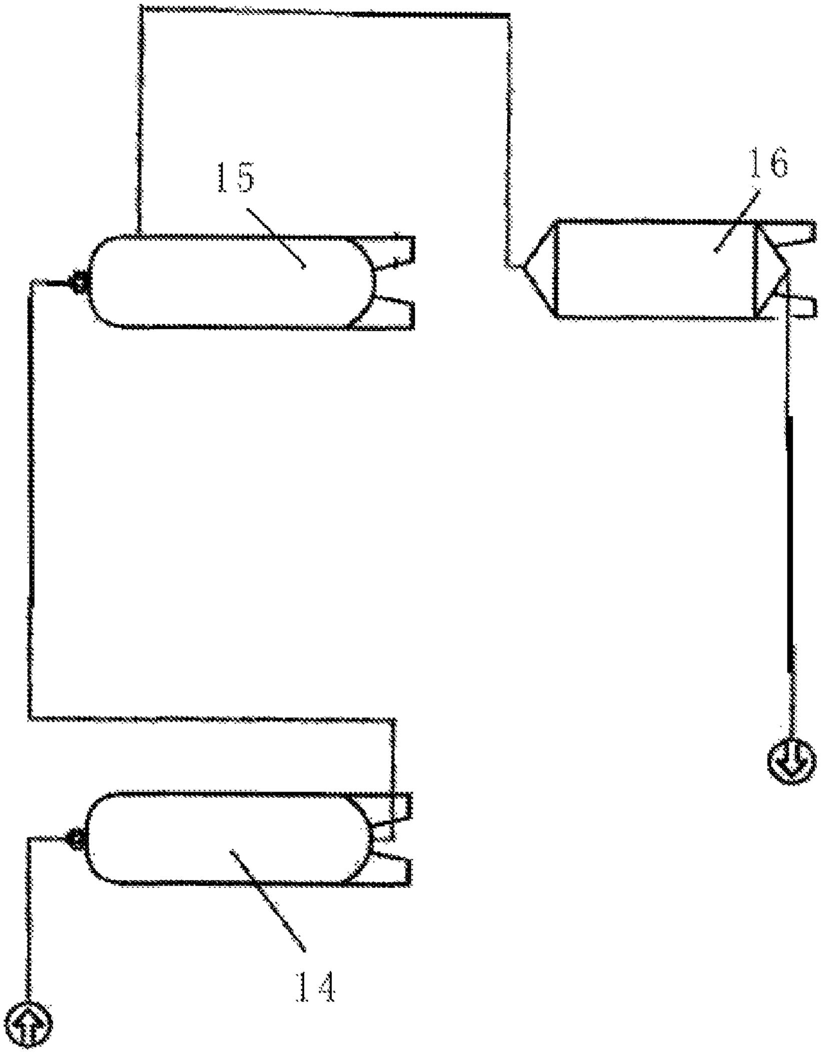
FIG. 3 is a schematic structure diagram of a deionized water system provided by an embodiment of the present disclosure.
Figure 4:
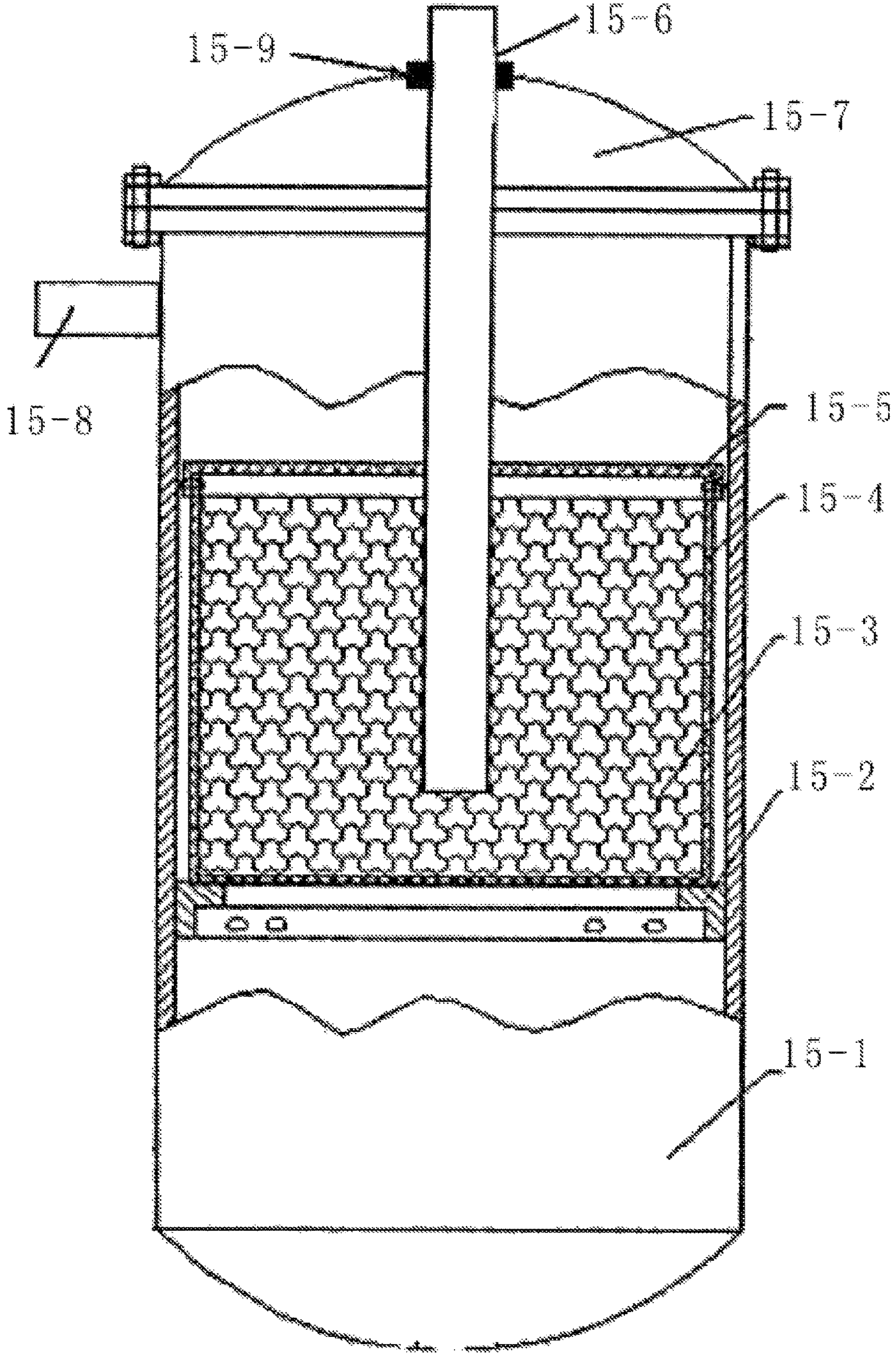
FIG. 4 is a schematic structure diagram of a deionized exchange resin tank provided by an embodiment of the present disclosure.

As illustrated in FIGS. 3 and 4, in an ionic water system provided by an embodiment of the present disclosure, cooling water is deionized water treated by a deionized water system 13, has extremely low conductivity, can pass through the high-voltage side three-phase modules 2, 3, and 4 and the low-voltage side module 5 within a short distance, and ensures the insulation requirement thereof. The cooling circuit 12 of the high-frequency transformer, the cooling circuits 6' of the high-voltage side modules, and the cooling circuit 6 of the low-voltage side module are water circuits with the same cooling water flow. Meanwhile, in order to improve the cooling efficiency and reduce the size of the power electronic transformers, the high-voltage side modules, the low-voltage side module, and the high-frequency transformer 1 all adopt a water cooling mode. The deionized water system 13 includes: a coarse filter 14, a deionized exchange resin tank 15 and a fine filter 16, which are sequentially connected. The deionized exchange resin tank 15 includes: a tank body 15-1, a support frame 15-2, a net cage 15-4, deionized exchange resin 15-3 and an upper cover 15-7. The tank body 15-1 is a cylindrical tank body. The upper cover 15-7 is arranged at an upper opening of the tank body 15-1. The cylindrical support frame 15-2 is arranged at a lower portion in the tank body. An outer diameter of the support frame 15-2 is matched with an inner diameter of the tank body 15-1. The net cage 15-4 is of a cylindrical structure in the tank body 15-1. A net cover 15-5 is arranged at an upper end of the net cage 15-4. The deionized exchange resin 15-3 is arranged in the net cage 15-4. An edge of a bottom surface of the net cage 15-4 is arranged on the support frame 15-2. A water inlet pipe 15-8 is arranged on a side surface of the tank body 15-1 above the net cage 15-4. A water outlet pipe 15-6 is arranged in a through hole in the center of the upper cover 15-7. A lower end of the water outlet pipe 15-6 extends into the deionized exchange resin 15-3. A sealing ring 15-9 is arranged between the water outlet pipe 15-6 and the through hole in the center of the upper cover 15-7. The deionized exchange resin 15-3 is arranged in the net cage 15-5. When the deionized exchange resin 15-3 needs to be replaced, the upper cover 15-7 is opened, the net cage 15-4 is lifted, and the work of replacing the deionized exchange resin 15-3 can be completed conveniently and quickly. The deionized exchange resin tank 15 is simple in overall structure, low in cost, and convenient to maintain.

(1) According to the technical solution provided by the embodiment of the present disclosure, the adopted support is an epoxy support that wraps the high-frequency transformer inside and is surrounded by the high-voltage side modules and the low-voltage side module which are annularly arranged, so that the transformer structure is more compact and uniform, and a functional structure is unique and innovative. Further, the support is the epoxy support, so that the problems that epoxy resin is difficult to solidify and form after casting and deformation is difficult to ensure since an iron core and a coil of the high-frequency transformer are heavy in dead weight are solved. Meanwhile, the insulation requirement of the overall structure of the power electronic transformers is guaranteed, and the yield of products is greatly improved.

(2) According to the technical solution provided by the embodiment of the present disclosure, a mixed design of series and parallel connection of liquid cooling pipes is adopted, so that the advantages of minimum number of joints, small water leakage and seepage probability, and stronger integrity are achieved.

(3) According to the technical solution provided by the embodiment of the present disclosure, the high-voltage side modules, the low-voltage side rectifier module, and the transformer are lapped through the copper-clad aluminum buses, so that the characteristics of cost saving and suitability for high-frequency working conditions are achieved.

(4) According to the technical solution provided by the embodiment of the present disclosure, the high-voltage side rectifier modules adopt full-control devices to integrate the rectification and inversion functions, so that the size is smaller.

(5) According to the technical solution provided by the embodiment of the present disclosure, the deionized exchange resin tank is adopted. When deionized exchange resin needs to be replaced, the upper cover is opened, the net cage is lifted, and the work of replacing the deionized exchange resin can be completed conveniently and quickly. The overall structure is simple, the cost is low, and the maintenance is convenient.

The above are only the embodiments of the present disclosure and are not intended to limit the present disclosure. Any modifications, equivalent replacements, improvements, etc. made within the spirit and principle of the present disclosure are included within the scope of the claims appended to the present disclosure during pending application.

What is claimed is:

1. A power electronic transformer structure, comprising: a support, a high-frequency transformer, a base, high-voltage side modules and a low-voltage side module;

wherein the high-voltage side modules are respectively disposed at front, top, and back portions of the support;

the low-voltage side module is disposed at a bottom portion of the support; and the high-frequency transformer is disposed at a middle portion of the support;

where the high-voltage side modules are connected to the high-frequency transformer through lapped copper buses;

the low-voltage side module is connected to the high-frequency transformer through a lapped copper bus; and the copper buses are copper-clad aluminum buses.

2. The power electronic transformer structure of claim 1, wherein the high-frequency transformer, the high-voltage side modules, and the low-voltage side module are respectively provided with a cooling circuit;

the cooling circuit of the high-frequency transformer is respectively connected to the cooling circuits of the high-voltage side modules and the cooling circuit of the low-voltage side module in parallel; and the cooling circuits of the high-voltage side modules are arranged in series with the high-voltage side modules and the low-voltage side module.

3. The power electronic transformer structure of claim 1, wherein the support is #-shaped, the high-frequency transformer is arranged on an inner side of the #-shaped support, and an outer side of the high-frequency transformer is tangent to inner sides of four components forming the #-shaped support.

4. The power electronic transformer structure of claim 2, wherein the cooling circuits are cooling water circuits, water in the cooling circuits is deionized water treated by a deionized water system, and the cooling circuit of the high-frequency transformer, the cooling circuits of the high-voltage side modules, and the cooling circuit of the low-voltage side module are water circuits with same cooling water flow.

5. The power electronic transformer structure of claim 4, wherein the high-voltage side modules and the low-voltage side module respectively comprise: a shielding shell, a driving board card, a power semiconductor device, and a water-cooled plate connected to the cooling circuit; electrodes are arranged at an inlet and an outlet of the water-cooled plate; and the electrodes are made of following components in percentage by mass: 0.02% of P, 0.11% of Mn, 0.282% of Si, 25% of Cr, 18% of Ni, 0.293% of Mo, 0.121% of Cu, and 0.0015% of Ti.

6. The power electronic transformer structure of claim 1, wherein the low-voltage side module drives and controls the high-voltage side modules through optical fibers.

7. The power electronic transformer structure of claim 1, wherein high-voltage side rectifier modules and a low-voltage side rectifier module are fixedly connected to the support through fixing members, respectively; and the support is tightly connected to the high-frequency transformer through fasteners, and the fasteners are connected to an iron core or a coil of the high-frequency transformer through equipotential wires.

8. The power electronic transformer structure of claim 1, wherein the support and the base are made of an epoxy material.

9. The power electronic transformer structure of claim 1, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

10. The power electronic transformer structure of claim 2, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

11. The power electronic transformer structure of claim 3, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

12. The power electronic transformer structure of claim 4, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

13. The power electronic transformer structure of claim 5, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

14. The power electronic transformer structure of claim 6, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

15. The power electronic transformer structure of claim 7, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

16. The power electronic transformer structure of claim 8, wherein the power electronic transformer structure comprises: a valve structure formed by connecting N power electronic transformers in series; and head ends of the power electronic transformers are connected to an alternating current power grid and tail ends of the power electronic transformers are connected to a direct current power grid after the power electronic transformers are connected in series on a high-voltage side;

wherein the high-voltage side modules are configured to rectify and invert a network side current into a high-frequency current through internal full-control devices and inject the high-frequency current into the high-frequency transformer; the high-frequency current is converted into a low-voltage direct current through a low-voltage side rectifier module after passing through the high-frequency transformer;

the low-voltage direct current is configured to supply power to a direct current load.

17. A power electronic transformer structure, comprising: a support, a high-frequency transformer, a base, high-voltage side modules and a low-voltage side module;

wherein the high-voltage side modules are respectively disposed at front, top, and back portions of the support;

the low-voltage side module is disposed at a bottom portion of the support; and the high-frequency transformer is disposed at a middle portion of the support;

wherein the high-frequency transformer, the high-voltage side modules, and the low-voltage side module are respectively provided with a cooling circuit;

the cooling circuit of the high-frequency transformer is respectively connected to the cooling circuits of the high-voltage side modules and the cooling circuit of the low-voltage side module in parallel; and the cooling circuits of the high-voltage side modules are arranged in series with the high-voltage side modules and the low-voltage side module.

18. A power electronic transformer structure, comprising: a support, a high-frequency transformer, a base, high-voltage side modules and a low-voltage side module;

wherein the high-voltage side modules are respectively disposed at front, top, and back portions of the support;

the low-voltage side module is disposed at a bottom portion of the support; and the high-frequency transformer is disposed at a middle portion of the support;

wherein the support is #-shaped, the high-frequency transformer is arranged on an inner side of the #-shaped support, and an outer side of the high-frequency transformer is tangent to inner sides of four components forming the #-shaped support.

* * * * *